April 21, 1959　　H. G. CAHILL ET AL　　2,882,553
APPARATUS FOR SIZING AND COALESCING ARTICLES
Filed Dec. 13, 1954　　2 Sheets-Sheet 1
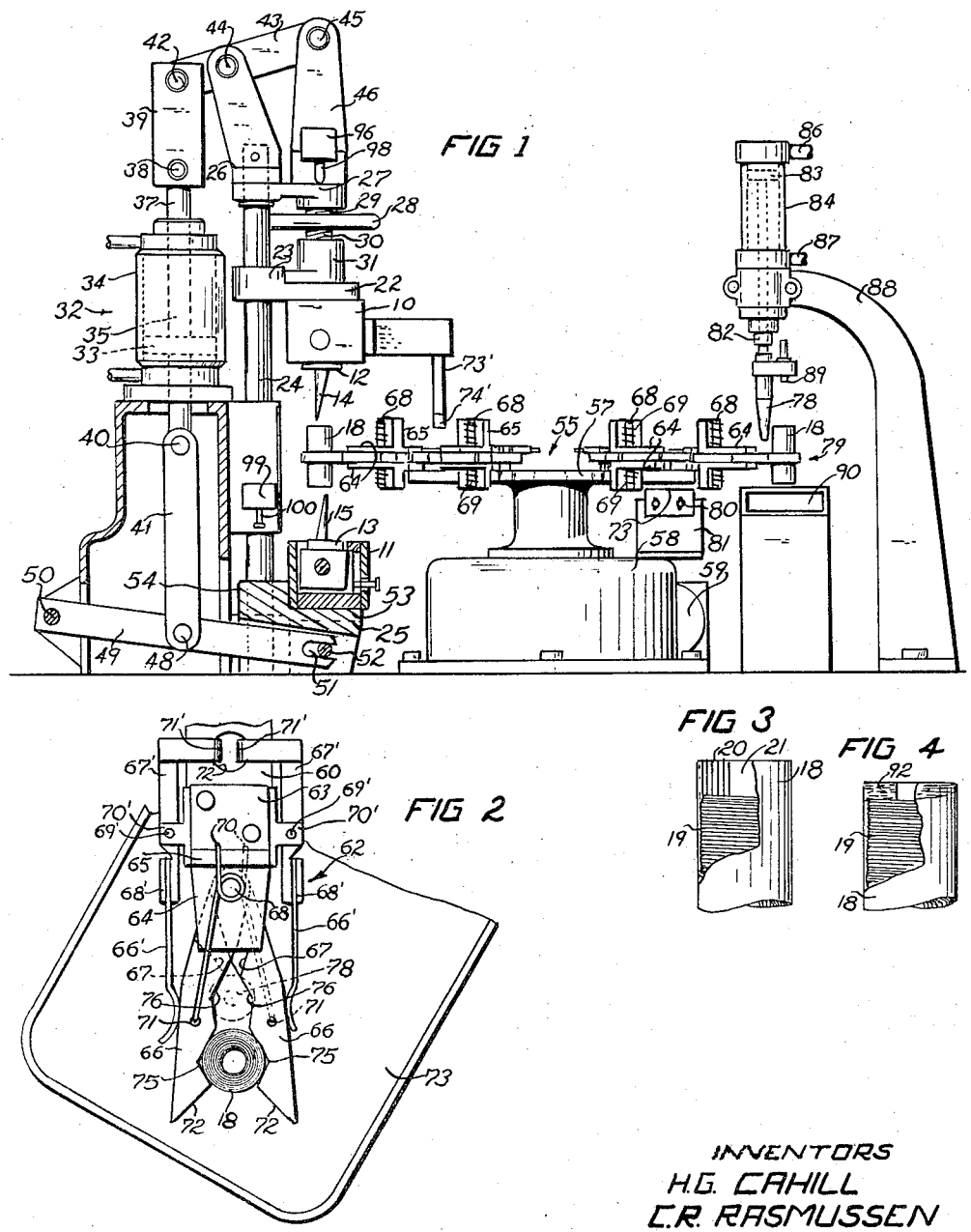
INVENTORS
H.G. CAHILL
C.R. RASMUSSEN
By W.C. Parnell
ATTORNEY

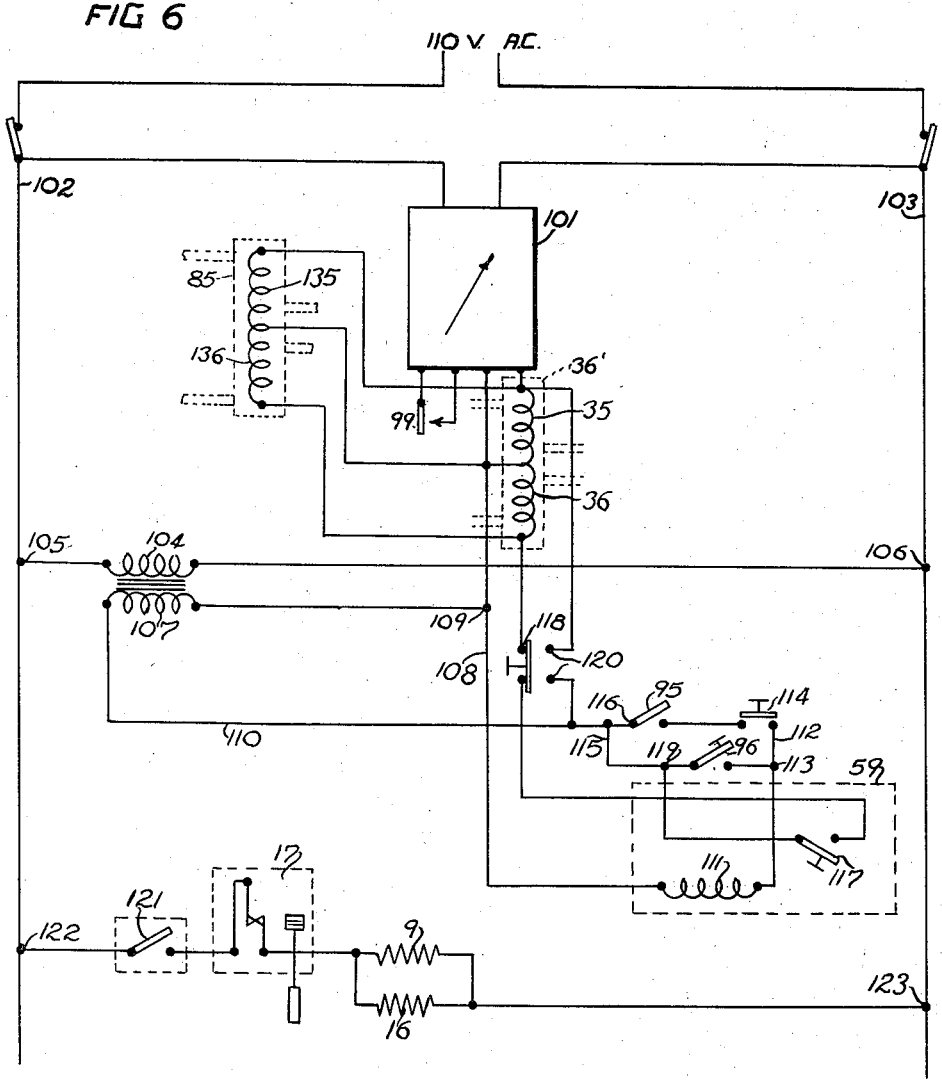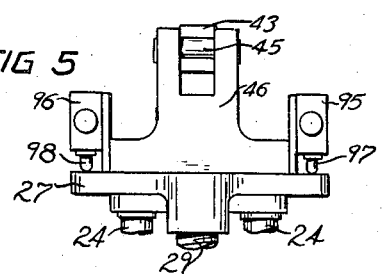
INVENTORS
H.G. CAHILL
C.R. RASMUSSEN
ATTORNEY

2,882,553

United States Patent Office
Patented Apr. 21, 1959

2,882,553

APPARATUS FOR SIZING AND COALESCING ARTICLES

Harold G. Cahill, Riverside, and Clarence R. Rasmussen, La Grange, Ill., assignors to Western Electric Company, Incorporated, New York, N.Y., a corporation of New York Application December 13, 1954, Serial No. 474,676

5 Claims. (Cl. 18—5)

This invention relates to coalescing apparatus particularly to apparatus for coalescing and sizing filled coils.

The term "filled coils" is used to define electrical coils including interleaving sheets of cellulose acetate or the like between and around the various layers of wire forming each coil. In some instances, a series of coils of this type are wound simultaneously on separated zones of a winding arbor, starting with one or more convolutions of the insulating material of sufficient width to include all of the coils and followed by subsequent sheets of equal width covering the layers of windings of wire. When the winding operation has been completed, the so-called stick of coils is removed from the winding arbor and is separated into individual coils by severing the interleaving and initial sheets midway between the coils. Electrical coils of this type may be employed in the manufacture of relays or the like but in order that they may be used successfully, it is necessary that their ends, which are composed solely of the layers of insulating material, be coalesced to reduce the coils to a definite longitudinal dimension. Furthermore, the diameter of the central aperture of each coil must be sized to receive the core of the relay or electrical unit of which it is to be a part.

In the past, coils of this type have been coalesced and sized on a compressing apparatus of the type shown in the Martindell Patent 2,366,976 where it was necessary to feed the coils manually to a lower sizing element movable outwardly to facilitate feeding of the coils singly thereto. In this type of apparatus only the lower sizing element and coalescing unit is moved relative to the coil during the work stroke and as a result, the entire force applied to the coil originates in the lower unit.

The object of the present invention is an apparatus which, although simple in structure and operation, is highly efficient in coalescing and sizing coils uniformly.

With this and other objects in view, the invention comprises reciprocating elements for sizing a coil, means for clamping and moving a coil into position between the elements while additional means is provided for simultaneously actuating the elements into engagement with the coil to size it.

More specifically, the apparatus includes spaced units including sizing and coalescing elements operatively connected to a single power means adapted to actuate the units simultaneously to move the tapered portions of the elements simultaneously into a coil and cause them to cooperate with each other in sizing and coalescing the core receiving aperture thereof. The sizing and coalescing elements of the units are heated to like temperatures and while the tapered portions are moved to size and coalesce the material forming the aperture of the coil, their end portions engage their respective ends of the coil simultaneously and apply equal pressures thereto to coalesce their ends of the coil to produce a coil of a given length with like coalesced ends. To make it possible for the sizing and coalescing elements to perform the satisfactory uniform results, a dial or turret type feeding unit has notched jaws spring actuated to grip coils successively near their centers at like positions when moved between the jaws on a table or locating element. The turret is operated in timed relation with the sizing and coalescing units and also with an ejecting unit capable of opening the jaws to release the completed coils when moved into alignment with a chute.

Other objects and advantages will be apparent from the following detailed description when considered in conjunction with the accompanying drawings, wherein:

Fig. 1 is a front elevational view of the apparatus, portions thereof being shown in section;

Fig. 2 is a fragmentary top plan view of one of the gripping units of the feeding mechanism shown at the loading station;

Fig. 3 is a fragmentary partially sectional view of a coil prior to sizing and coalescing;

Fig. 4 is a fragmentary partially sectional view of a coil after sizing and coalescing;

Fig. 5 is a fragmentary front elevational view of the top portion of the apparatus, and Fig. 6 is a schematic wiring diagram of the controlling means for the apparatus.

The apparatus has upper and lower units 10 and 11 including sizing coalescing elements 12 and 13 having tapered spindle-like portions 14 and 15, respectively. The elements and members are heated by suitable electrical heating coils 9 and 16 under the control of a thermocouple 17 (Fig. 6) to maintain them at the desired temperatures to bring about satisfactory sizing and coalescing of coils of the type shown in Fig. 3. The coil, indicated at 18 including its layers 19 of wire and interleaving sheets 20 of insulating material is longer than desired and includes a core receiving aperture 21 which may not be of the proper size for the core on which it is to be mounted. The upper unit 10 is mounted on a carriage 22 slidably disposed at 23 on spaced vertically positioned parallel guide rods 24. The guide rods 24 are mounted in apertures in a base 25 and have their upper ends secured in a bracket-like connecting member 26. A member 27, similar in contour to the carriage 22 is slidably mounted on the guide rods 24. The carriage 22 is adjustably connected to the member 27 by threaded adjusting means including a hand wheel 28 and threaded shanks 29 and 30. The upper shank 29 having left-hand threads is disposed in a similarly threaded aperture of the member 27, while the lower shank 30 has right-hand threads and is disposed in a similarly threaded member 31 mounted on the carriage 22. In this manner, rotation of the hand wheel 28 in one direction or the other will raise or lower the unit 10 moving it relative to the unit 11.

The units 10 and 11 are actuated simultaneously toward and away from each other by a single unit or actuating means 32 which in the present embodiment of the invention is a double-acting piston 33 in a cylinder 34 controlled by solenoid windings 35 and 36 of a solenoid operable four-way valve 36'. The piston 33 is fixed to a rod 37 which extends upwardly through the heads of the cylinder of the unit 32, where its upper end is connected at 38 to a link 39, and its lower end is connected at 40 to a link 41. The link 39 is connected at 42 to one end of a lever 43, pivoted at 44 in a bifurcated end of the bracket member 26, and has its other end pivotally connected at 45 to an arm 46 fixed to the upper carriage 22. The link 41 is pivotally connected adjacent its lower end at 48 to a lever 49, pivotally supported adjacent one end at 50 while the other end is forked at 51 to straddle a pin 52 of a carriage 53 supporting the lower unit 11. The carriage 53 has bores 54 fitting on the rods 24 for sliding movement thereon.

A feeding unit indicated generally at 55 includes a turret type table 57 mounted for intermittent rotation on a housing 58 by a conventional mechanism (not shown) operated through a power means 59 in timed relation with the means for actuating valve 36' as will be described hereinafter. The table 57 includes a plurality of arms 60 extending radially at equally spaced positions from the axis of the table and having gripping units 62 mounted on the ends thereof. The gripping units are identical in structure and the description of one will apply equally to all of the units. Attention is directed to Fig. 2 illustrating a bracket 63 mounted on the arm 60 of the table 57 and having parallel horizontal portions 64 formed integral with a vertical portion 65. In the present embodiment of the invention gripping jaws 66 are formed to lie parallel with each other and their inner portions are reduced in thickness as at 67 so that they may be positioned between the parallel horizontal portions 64 of the bracket and pivotally connected to each other by a rod 68. The rod 68 extends through the horizontal members 64 and is fixed thereto. Helical springs 69 positioned above and below the horizontal members 64 have their innermost ends fixed to the respective ends of the vertical member 65 as at 70 while their outermost ends extend beyond the horizontal members 64 and are fixed at 71 to their respective jaws 66. The springs 69 provide like forces which are sufficient to move the jaws toward each other and to firmly grip a coil 16 when forced therebetween. It will be noted that the jaws 66 have tapered surfaces 72 at their outer ends to facilitate opening the jaws when a coil is moved on a table or locating element 73 toward the axis of the feeding unit. Furthermore, the jaws are provided with outer notched portions 75 and inner notched portions 76, the first notched portion 75 being adapted to receive and firmly hold successive coils 18. The inner notches 76 are adapted to receive a tapered ejecting element 78 at the unloading station indicated at 79 in Fig. 1. Forces, in addition to those inherent in the springs 69 are applied to the jaws 66 at the operating position. These forces are created in resilient fingers 66' (Fig. 2), for each jaw 66, with their curved outer free ends normally engaging their respective jaws and their inner ends fixed to levers 67' at 68'. The levers 67' are pivotally supported at 69' in bifurcated brackets 70' mounted on the arms 60 of the table 57. The inner portions of the pairs of levers 67' extend toward each other and have surfaces 71' tapered or rounded adjacent an aperture 72' in each arm 60 to be actuated by a spring pressed plunger 73' (Fig. 1) carried by and movable with the unit 10. The lower end 74' of the plunger 73' is wedge-shaped to enter between the surfaces 71' of the levers 67', and the apertures 72' singly, to force the levers about their pivots to force the fingers 66' against their jaws 66. The plunger 73' is of sufficient length to actuate the levers in the operating positions to cause the fingers to apply suitable locking force to the jaws to hold the coil held thereby against displacement during closing of the units 10 and 11 on the coil and particularly during opening of the units. The locking means is released after the portions 14 and 15 of the elements 12 and 13 are removed from the coil 18. The table 73 is adjustably mounted as at 80 on any suitable supporting means 81 so that the coils held by the gripping units 62 may be positioned centrally of the units 10 and 11.

The ejecting element 78 is supported by a piston rod 82 carried by a piston 83 in a cylinder 84 which is operated simultaneously with the cylinder 34 under the control of a four-way solenoid operated valve 85. The four-way valves are conventional for pneumatic systems. The cylinder 84 is supported by a bracket 88 and is located to position the element 78 in alignment with the notched portions 76 of the clamping jaws when at rest in the unloading position. An adjustable member 89 carried by the element 78 is positioned to engage any of the coils at the unloading position, if they should tend to stick to either of the jaws 66, to push the coils free of the jaws into a chute 90 which will carry the completed coils into a suitable receptacle.

Attention is directed to Fig. 6 which illustrates a control circuit linking the feeding unit 55, the forming units 10 and 11 and the ejecting element 78. There are two switches 95 and 96 supported by the arm 46 (Fig. 5) with their plungers 97 and 98 positioned to be actuated by the member 27 for the unit 10. A switch 99 mounted on a portion of the base 25 has its plunger 100 positioned to be actuated by the carriage 53 for the unit 11. Switch 95 is normally open, but closed and held closed by the member 27 when in the retracted position shown in Figs. 1 and 5. Switch 96 is normally open and momentarily closed by the member 27 when moved into the retracted position. Switch 99, when actuated by the carriage 53, closes a starting circuit of a variable timing unit 101. The unit 101 is supplied with electrical energy from lines 102 and 103 of a 110 volt alternating current supply and controls the time units 10 and 11 remain closed. When this time has expired, coil 35 will be energized to actuate the valve 36' to cause retraction of the units 10 and 11.

A primary winding 104 of a transformer is connected between lines 102 and 103 at points 105 and 106. A secondary winding 107 of the transformer is connected at one side to line 108 at connection 109 and at the other side through line 110 to switch 95. The power means 59 for the feeding unit 55 includes a winding 111 of a retract solenoid of a commercially known, built-in directional valve. The detailed structure of the valve and the other commercially known units completing the air operated rotary feed for intermittently moving the table 57 are not shown. In general, however, energization of the solenoid winding 111 causes retraction of an air cylinder piston rod until it operates a poppet valve which reverses the direction of air flow through the directional valve thereby indexing the table one position. The winding 111 is connected at one side to line 108 and at the other side to line 112 which extends through connection 113 to a contact of a start switch 114. The connection 113 is for line 115 extending to line 110 at connection 116, thus by-passing switches 95 and 114 through switch 96.

A momentary contact switch 117 is positioned in the feeding unit 55 to be actuated by any suitable means (not shown) to complete a circuit from secondary winding 107, connection 109, winding 36 of valve 36', stop switch 118, switch 117, connection 119 of line 115, connection 116 and line 110. Windings 135 and 136 for the four-way solenoid operable valve 85 are connected in parallel with their respective windings 35 and 36 of valve 36'. The stop switch 118, when actuated to stop the apparatus will close its auxiliary contacts 120 completing circuits through retracting windings 35 and 125 of their respective four-way valves 36' and 85.

The heating elements 9 and 16 are in a circuit under the control of a switch 121 and the thermocouple unit 17. This circuit may be traced from line 102 at connection 122, through switch 121, thermocouple 17, coils 15 and 16 to line 103 at connection 123.

Before considering the mechanical function of the apparatus, further consideration is given to the electrical features thereof. The apparatus is initially started by momentarily closing start switch 114. This causes energization of the winding 111 of the table feed drive to move the table to the next position. This can happen only when the units 10 and 11 and the ejector 78 are in their starting retracted positions closing switch 95. Once the operation of the apparatus is started, it continues automatically through the functions of the momentary switches 96 and 117 and the normally open switch 99. Switch 117 closed when the table 57 reaches next position, completes circuits through operating windings 36 and 136 to cause the units 10 and 11 to move into forming positions and cause downward movement of the ejector 78. Switch 99 closes a circuit through the timer 101 determining the time the units remain closed prior to completing circuits through retracting windings 35 and 135 of valves 36' and 85. Switch 96, momentarily closed when the units 10 and 11 are retracted, causes energization of winding 111 to index the table one position. This operation continues automatically until switch 113 is actuated manually to stop and reset the apparatus.

Considering now the mechanical functions of the apparatus, it will be apparent that, once the units 10 and 11 have been adjusted depending upon the finished size desired for the coils 18 and the table or locating element 73 has been adjusted accordingly, the apparatus may be set in motion and all that is required of the operator is to move a coil 18 with an end thereof resting on the table 73 until it forces the jaws 66 open to receive the coil in the notches 75. This action is repeated for each gripping unit 62 when in the loading position. Intermittent rotary motion of the unit 55 will bring the gripped coils automatically into alignment centrally between the units 10 and 11, successively. While the feeding unit is at rest, the single unit 32 will be actuated to move the units 10 and 11 simultaneously toward each other causing simultaneous and uniform action of the sizing and coalescing portions 14 and 15 in the core receiving aperture 19 of each coil. The plunger 73' moving in advance of the elements 12 and 13 and their portions 14 and 15 will actuate the levers 67' to cause the fingers 66' to apply locking forces to the jaws 66. While the heated portions 14 and 15 are performing their functions jointly, the inner surfaces of the elements 12 and 13 move simultaneously under like pressures against the respective ends of the coils to coalesce the ends of the interleaving sheets 20 to produce like formations indicated at 92 of the ends of the successive coils. With the centering of the coils between the units 10 and 11 and the simultaneous movement of the units to bring the portions 14 and 15 into action in the aperture 19 of each coil simultaneously, the core receiving apertures will be made uniform throughout to the size desired for the core. Furthermore, with the inner surfaces of the elements 12 and 13 heated to like temperatures and moved like distances to simultaneously engage the respective ends of the coil and to thereafter apply like pressures to these ends of the coil the effective result on each end will be identical, thus reducing each coil to the desired length and coalescing the ends of the materials to finish the coils.

The jaw locking means, originating in the plunger 73' eliminates shifting of the coil in the jaws 66 during closing or opening of the units 10 and 11. Although the units are closed under like pressures on a coil centrally positioned therebetween, portions of the coil may respond to the heated elements 12 or 13 and its portion 14 or 15 more quickly than the other resulting in shifting of the coil if the jaws are not locked on the coil. A similar condition may exist during opening of the units to cause shifting of the coil if the jaws are not held locked by the plunger 73' until the elements 12 and 13 and the portions 14 and 15 are removed therefrom. When the finished coils leave the coalescing and sizing units 10 and 11 they are allowed a period of time for cooling before reaching the ejecting unit. While the unit 55 is at rest, the ejecting element 78 will be reciprocated downwardly engaging the notched portions 76 of the jaws in that position, thus opening the jaws to release the finished coil, allowing it to drop into the chute 90.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A coil forming apparatus comprising a pair of forming units normally spaced from each other at an operating position and supported for movement toward and away from each other to form and move free of coils fed to said position, aligned forming elements in the units, a feeding unit, including spaced pairs of spring loaded jaws for removably holding coils to be formed, movable intermittently to locate coils successively between and in alignment with the elements of the forming units, each pair of jaws having lever-like locking members normally ineffective, and a plunger movable with the forming units at the operating position to actuate the lever-like members in that position to lock the jaws on the coil and hold the jaws locked prior to the forming of the coil, during forming of the coil and during movement of the forming units free of the coil.

2. A coil forming apparatus comprising a pair of forming units normally spaced from each other and supported for movement toward each other, aligned forming elements in the units, a feeding unit including spaced clamps for coils to be formed movable intermittently to position the clamps with their coils singly between and in alignment with the elements of the forming units, each clamp including a pair of spring actuated pivotal jaws having sets of notches in their inner surfaces, one set being adapted to receive and firmly hold the coils singly therebetween, and an ejector reciprocable into and out of the other set of notches to open the successive jaws to free the coils.

3. A coil forming apparatus according to claim 1 in which the feeding unit has an operating solenoid and an operating circuit therefor including a switch operated when the forming units have moved free of a coil for energizing the solenoid to bring another coil into operating position.

4. A coil forming apparatus according to claim 1 having an electrical circuit for controlling the movement of the forming units and a switch in the feeding unit for conditioning the circuit to move the forming units only when the feeding unit is at rest with a pair of jaws at the operating position.

5. A coil forming apparatus according to claim 2 having an electrical circuit for energizing the forming units, the feeding unit, and the ejector and switches in the circuit controlled by the position of the forming units for conditioning the circuit to move the feeding unit.

References Cited in the file of this patent

UNITED STATES PATENTS

| | | |
|---|---|---|
| 917,627 | Lizotte | Apr. 6, 1909 |
| 1,871,915 | Phelps | Aug. 16, 1932 |
| 1,885,758 | Parker | Nov. 1, 1932 |
| 2,148,591 | Taylor | Feb. 28, 1939 |
| 2,366,976 | Martindell | Jan. 9, 1945 |
| 2,440,806 | Megow et al. | May 4, 1948 |
| 2,508,687 | Richter | May 23, 1950 |